United States Patent
Nielsen

(10) Patent No.: US 9,499,305 B2
(45) Date of Patent: Nov. 22, 2016

(54) DISPENSING DEVICE FOR DISPENSING A LIQUID PRODUCT

(71) Applicant: Mezurware, LLC, Kernersville, NC (US)

(72) Inventor: Keld Krogh Nielsen, Graasten (DK)

(73) Assignee: Mezurware, LLC, Kernersville, NC (US)

( * ) Notice: Subject to any disclaimer, the term of this patent is extended or adjusted under 35 U.S.C. 154(b) by 208 days.

(21) Appl. No.: 14/379,944

(22) PCT Filed: Feb. 21, 2013

(86) PCT No.: PCT/US2013/027111
§ 371 (c)(1),
(2) Date: Aug. 20, 2014

(87) PCT Pub. No.: WO2013/126553
PCT Pub. Date: Aug. 29, 2013

(65) Prior Publication Data
US 2016/0207664 A1    Jul. 21, 2016

Related U.S. Application Data

(63) Continuation-in-part of application No. 13/609,873, filed on Sep. 11, 2012, now Pat. No. 8,657,159.

(30) Foreign Application Priority Data

Feb. 22, 2012   (DK) ................................ 2012 00143

(51) Int. Cl.
*G01F 11/10*   (2006.01)
*G01F 11/26*   (2006.01)
(Continued)

(52) U.S. Cl.
CPC ........... *B65D 25/52* (2013.01); *B65D 47/2031* (2013.01); *G01F 11/288* (2013.01);
(Continued)

(58) Field of Classification Search
CPC ... B65D 25/52; B65D 47/2031; G01F 11/10; G01F 11/26; G01F 11/28; G01F 11/262–11/263; G01F 11/268; G01F 11/288
See application file for complete search history.

(56) References Cited

U.S. PATENT DOCUMENTS

| | | |
|---|---|---|
| 3,361,305 A | 1/1968 | Spatz |
| 3,828,985 A | 8/1974 | Schindler |

(Continued)

FOREIGN PATENT DOCUMENTS

| | | |
|---|---|---|
| FR | 2671537 | 7/1992 |
| FR | 2671538 | 7/1992 |

(Continued)

OTHER PUBLICATIONS

International Search Report for corresponding PCT Application No. PCT/US2013/02711, date of mailing Apr. 24, 2013.

*Primary Examiner* — Frederick C Nicolas
(74) *Attorney, Agent, or Firm* — Myers Bigel, P.A.

(57) ABSTRACT

A dispensing device (1) includes a first chamber (4) that is longitudinally movable in a second chamber (5) and has an outer surface sealingly contacting an inner surface of the second chamber (5). An intermediate valve (3) is positioned between an interior part of the first chamber (4) and an interior part of the second chamber (5). The intermediate valve (3) includes a valve seat plate (7) having at least one opening (8) and a valve flapper plate (9) having at least one flap (10) for covering the at least one opening (8) in the valve seat plate (7). The at least one flap (10) moves to an open position allowing the liquid product to flow from the interior space of first chamber (4) to the interior space of the second chamber (5) when the first chamber (4) is moved in a first longitudinal direction and moves to a closed position limiting flow of the liquid product when the first chamber (4) is moved in an opposite second longitudinal direction.

8 Claims, 16 Drawing Sheets

(51) Int. Cl.
    *B67D 7/56*     (2010.01)
    *B65D 25/52*     (2006.01)
    *B65D 47/20*     (2006.01)
    *G01F 11/28*     (2006.01)

(52) U.S. Cl.
    CPC .............. *G01F 11/10* (2013.01); *G01F 11/26* (2013.01); *G01F 11/262* (2013.01); *G01F 11/263* (2013.01); *G01F 11/28* (2013.01)

(56) References Cited

U.S. PATENT DOCUMENTS

| | | | | |
|---|---|---|---|---|
| 4,607,762 | A | | 8/1986 | Zulauf et al. |
| 4,941,598 | A | | 7/1990 | Lambelet, Jr. et al. |
| 4,951,839 | A | * | 8/1990 | Kong ............ G01F 11/26 141/322 |
| 5,078,305 | A | * | 1/1992 | Glynn ............ G01F 11/263 222/442 |
| 5,292,039 | A | | 3/1994 | Neofitou |
| 5,358,152 | A | * | 10/1994 | Banks ............ B65D 41/26 222/158 |
| 5,967,377 | A | | 10/1999 | Glynn |
| 5,988,434 | A | * | 11/1999 | Keil ............ G01F 11/268 222/1 |
| 6,415,961 | B2 | | 7/2002 | Bonningue |
| 7,143,909 | B2 | * | 12/2006 | Peterson ............ G01F 11/261 222/456 |
| 8,657,159 | B2 | * | 2/2014 | Nielsen ............ B65D 25/52 222/156 |
| 2007/0016142 | A1 | | 1/2007 | Burren et al. |

FOREIGN PATENT DOCUMENTS

| | | |
|---|---|---|
| JP | 59-010248 | 1/1984 |
| JP | 2009208779 | 9/2009 |
| WO | WO 2009/076959 | 6/2009 |

* cited by examiner

DISPENSING DEVICE FOR DISPENSING A LIQUID PRODUCT

CROSS-REFERENCE TO RELATED APPLICATION

This patent application claims priority to Denmark Patent Application No. PA 2012 00143, filed on Feb. 22, 2012, and to U.S. patent application Ser. No. 13/609,873, filed Sep. 11, 2012. The entirety of each of these applications is hereby incorporated by reference in its entirety.

FIELD OF THE INVENTION

The present invention relates to a dispensing device for dispensing a liquid product, such as cleaning materials, detergents, softeners, liquid toilet soap, shampoo, medicine, liquid foodstuff such as syrup, pulped marmalade, chocolate sauce, ketchup, different type of dressings, sauces etc., from a container containing the liquid product. More particularly, the present invention relates to a liquid dispenser being capable of delivering consistently precise doses of liquid product, of efficiently preventing liquid product from being poured directly out of the container and of preventing that a part of the required dose of liquid product remains in the measuring chamber after dispensing the liquid.

BACKGROUND OF THE INVENTION

WO 2009/076959 A1 discloses a dispensing device for dispensing doses of liquid medium. The dispensing device comprises a first chamber and a second chamber divided from each other by an intermediate wall arranged in an interior part of the dispensing device. An inlet passage establishes a fluid connection between the first chamber and an interior part of a container containing the liquid product, and an outlet passage allows liquid product to be dispensed from the second chamber. An intermediate passage is defined at a position of an edge of the intermediate wall, thereby allowing a dose of liquid product to pass from the first chamber to the second chamber. The intermediate wall comprises a portion which is inclined or curved in a direction towards the first chamber. Thereby the first chamber defines a cavity or bowl-shaped region which traps liquid product when the dispensing device is oriented in a certain direction during a dispensing movement. This prevents liquid product from passing directly through the dispensing device.

One disadvantage of the dispensing device of WO 2009/076959 is that sticky and viscous liquid flows slowly out of the dispenser, and that, especially in the last part of the dosing process, such slow flow can lead the user to stop dosing before the dosing chamber is empty and thereby result in errors in the doses being dispensed by means of the dispensing device.

SUMMARY OF EMBODIMENTS OF THE INVENTION

It is an object of embodiments of the invention to provide a dispensing device for dispensing liquid product which is capable of dispensing doses of sticky and viscous liquid product in a more precise manner than prior art dispensing devices.

It is a further object of embodiments of the invention to provide a dispensing device for dispensing liquid product which is capable of preventing that liquid product is dispensed directly through the dispenser without being measured.

Some embodiments of the present invention provide a dispensing device for dispensing a liquid product from a container containing said product. The dispensing device includes a first chamber and a second chamber. The first chamber is longitudinally slidably movable in the second chamber and has an outer surface sealingly contacting an inner surface of the second chamber. An inlet passage includes at least one inlet opening that establishes a fluid connection between the first chamber and an interior part of the container. An outlet passage is adapted to deliver the liquid product being dispensed by the dispensing device. The outlet passage is fluidly connected to the second chamber. An intermediate valve is positioned between an interior part of the first chamber and an interior part of the second chamber. The intermediate valve includes a valve seat plate having at least one opening and a valve flapper plate having at least one flapper for covering the at least one opening in the valve seat plate. The at least one flapper moves to an open position allowing the liquid product to flow from the interior space of first chamber to the interior space of the second chamber when the first chamber is moved relative to the second chamber in a first longitudinal direction and moves to a closed position limiting flow of the liquid product from the interior space of the second chamber to the interior space of the first chamber when the first chamber is moved relative to the second chamber in an opposite second longitudinal direction to dispense the liquid product from the second chamber through the outlet passage.

According to a first aspect the invention provides a dispensing device for dispensing a liquid product from a container containing said product, the dispensing device comprising:

a first chamber and a second chamber, an inlet passage comprising at least one inlet opening and establishing a fluid connection between the first chamber and an interior part of a container having the dispensing device mounted thereon, an outlet passage adapted to deliver the liquid product being dispensed by means of the dispensing device, said outlet passage being fluidly connected to the second chamber, an intermediate valve dividing an interior part of the dispensing device into the first chamber and the second chamber, the intermediate valve comprising a valve seat plate provided with at least one opening and a valve flapper plate provided with at least one flapper for covering the at least one opening in the valve seat plate, said intermediate valve being arranged at the first chamber, the intermediate valve and the first chamber being provided with an outer dimension that is smaller than the inner dimension of the second chamber and said intermediate valve and the first chamber being movable into the second chamber like a piston.

The dispensing device according to embodiments of the invention is adapted to dispense liquid products, such as cleaning materials, detergents, softeners, liquid toilet soap, shampoo, medicine, liquid foodstuff such as syrup, pulped marmalade, chocolate sauce, ketchup, different types of dressings, sauces, or any other suitable kind of liquid product which it is desirable to dispense from a container containing the product. The dispensing device according to embodiments of the invention is further capable of dispensing a metered dose of liquid product. And still further to dispense a variable, metered dose of liquid product. This will be explained further below.

The inlet passage establishes a fluid connection between the first chamber and an interior part of a container having the dispensing device mounted thereon. Thus, when the dispensing device is mounted on a container, liquid product is allowed to pass from the interior of the container into the first chamber, and thereby into the dispensing device, via the inlet passage. Accordingly, when liquid product is dispensed from the container by means of the dispensing device, liquid product from the container first enters the dispensing device by entering the first chamber.

The first chamber and the container may be one integrated part, and the first chamber and the container may in this embodiment have the same diameter and the first chamber will then be the same as the container and there will be no direct inlet between the first chamber and the container, as the interior of the container and the first chamber is then one and the same chamber.

The outlet passage is fluidly connected to the second chamber, and it is adapted to deliver liquid product being dispensed by means of the dispensing device. Accordingly, when liquid product is dispensed by means of the dispensing device, it leaves the dispensing device from the second chamber and via the outlet passage.

The intermediate valve dividing an interior part of the dispensing device into the first chamber and the second chamber comprises a valve seat plate provided with at least one opening and a valve flapper plate provided with at least one flapper for covering the at least one opening in the valve seat plate. Accordingly, liquid product which has entered the first chamber from the container or, where the container and the first chamber are the same, liquid direct from the container is only allowed to pass into the second chamber via the intermediate valve. Subsequently, the liquid product can be delivered from the second chamber via the outlet passage. In summary, liquid product being dispensed by means of the dispensing device follows a fluid path from the container, through an inlet passage into the first chamber, in one embodiment the first chamber and the container are one and the same chamber, from the first chamber or container through the intermediate valve into the second chamber and out of the dispensing device via the outlet passage. The liquid is allowed to pass the intermediate valve via the at least one opening in the valve seat plate when the at least one flapper for covering the opening is lifted up or away from the opening in the valve seat plate.

The intermediate valve may be arranged at the end of the first chamber. Accordingly, the intermediate valve may act as an end wall for the first chamber.

The first chamber that is integrated with the intermediate valve has an outer dimension that is smaller than the inner dimension of the second chamber and said intermediate valve and the first chamber are movable into the second chamber like a piston.

The piston effect of the first chamber that is integrated with the intermediate valve secures that all the measured liquid in the second chamber passes out of the second chamber and out of the dispensing device via the outlet passage. The dispensing device therefore allows a more precise dose to be dispensed. Furthermore, the precision in the dispensed dose is very reliable in the sense that it can be trusted that the dispensed dose is the same each time the dispensing device is operated.

The dispensing device of embodiments of the present invention may be operated in the following manner. The dispensing device is mounted at an opening of a container containing liquid product to be dispensed by means of the dispensing device. Advantageously, the dispensing device may form an integral part of the container, so that the container volume and the first chamber volume are one and same volume.

When it is desired to dispense a dose of liquid product from the container, the first chamber that is integrated with the intermediate valve, in the following also called the piston, is pulled out of the second chamber until the volume of the second chamber corresponds to the desired dose of liquid product. The intermediate valve is open and liquid passes into the second chamber. When the desired dose has passed into the second chamber, the intermediate valve is closed and the piston is created and pushed into the second chamber and the liquid from the second chamber passes out of the dispensing device via the outlet passage. The piston secures that the second chamber is emptied and a precise dose is dispensed.

When the piston has secured that the second chamber is empty, the piston will be ready to be pulled out of the second chamber and a new dose may be measured and dispensed.

The intermediate valve may have a convex shape pointing towards the second chamber. According to this embodiment, both the valve seat plate and the valve flapper plate may have a convex shape.

The intermediate valve may be positioned in such a manner that the valve seat plate abuts against the first chamber and the valve flapper plate points towards the second chamber.

The one or more openings in the valve seat plate may be positioned in such a manner that a continuing flow of liquid can flow from the first chamber to the second chamber when the valve flapper does not cover the opening. In one embodiment more than one opening can be placed in a circle on the periphery of the valve seat plate. The openings in the valve seat plate may have a diameter that is widest at the periphery and the openings may have the shape of a triangle, a drop or the like.

The valve flapper plate may comprise more than one flap, the amount of flaps may be equivalent to the amount of openings in the valve seat plate. In one embodiment one flap covers more than one opening. One flaps may cover two openings. The flaps may be connected in the periphery of the valve flapper plate.

The valve flapper plate may comprise an opening in the centre of the flapper plate and the flaps may be formed by a plurality of T-shaped cuts. The valve flapper plate may be made from a flexible plastic material, for example silicone rubber.

The intermediate valve is closed when the first chamber is pushed into the second chamber; because of the forces from the liquid in the second chamber the flaps are pressed up against the valve seat plate. The shape and dimensions of the openings in the valve seat plate and the equivalent flaps in the valve flapper plate are chosen to secure that the intermediate valve is closed when the first chamber is pushed into the second chamber. On the other hand, the intermediate valve is dimensioned with a valve flapper plate where the flaps open when the first chamber is pulled out of the second chamber.

The first chamber is provided with a mechanism that prevents the first chamber from being pulled completely out of the second chamber, when the first chamber is pulled out of the second chamber. According to one embodiment the mechanism is provided with protrusions on the outside of the first chamber and on the inside of the second chamber.

When the first chamber is pulled away from the second chamber, the two protrusions will hit each other before the first chamber is pulled completely out of the first chamber, thereby preventing the first chamber from being separated from the second chamber.

The outlet passage adapted to deliver the liquid product from the container may be provided with a closing element, thereby preventing liquid from flowing out of the container unintentionally. The closing element may be in the form of a cap. In one embodiment the closing element is a valve or a membrane that opens when the pressure from the liquid inside the second chamber, the dosing chamber, rises above a given level.

An example of such a material may be a polymer such as silicone.

A variable dose of liquid may be dispensed from the container. The dose depends on how far the first chamber with the intermediate valve at the end is pulled away from the bottom of the second chamber. The further away, the higher the dose of liquid flowing into the second chamber and being ready for dispense when the first chamber is pushed into the second chamber.

The first chamber or the second chamber may be provided with an indication showing the volume of the second chamber and of the dose to be dispensed. The indication may be the use of transparent chambers. Another way is to provide the container or the first chamber with visible marks whereby the user can stop dosing when the edge of the second chamber reaches the mark.

On the outer surface, the first chamber may be provided with one or more recesses extending substantially in the longitudinal direction of the first chamber, and at the end pointing towards the first chamber, the second chamber is provided with tongues, the tongues having on the inside an outwardly projected edge that slides in the recess on the outer surface of the first chamber, when a tongue presses against the first chamber from the outside. The recesses may have different lengths in the longitudinal direction. By having recesses with different length in the longitudinal direction makes it possible to dose different doses from the container depending on which tongues is pressed against the match recesses. Each recess may have a partner with the same length arranged substantially on the opposite site. Hereby is provided a dispensing device where the user may press thumb and index finger against two tongues arranged substantially on opposite site and thereby dispensing the claimed dose.

The dispensing device may have the shape of a cylinder. The second chamber may furthermore have a shape causing that the container with the dispensing device can stand on a flat surface.

In some embodiments, the relative movement between the first chamber and the second chamber comprises sliding movement of the second chamber along the first chamber. In other embodiments, the relative movement between the first chamber and the second chamber comprises rotational movement by the second chamber relative to the first chamber.

The present invention further relates to a container for containing a liquid product, the container having a dispensing device according to the first aspect of the invention mounted thereon. The dispensing device may either be a separate part which is mounted onto the container, or it may form an integral part of the container.

According to one embodiment of the invention, the first chamber may be an integrated part of the container volume. According to a further embodiment, the inlet passage establishing a fluid connection between the first chamber and an interior part of a container having the dispenser device mounted thereon may not be well defined, as the first chamber and the container are one and the same chamber. This makes it an easily injection moulded product, thereby contributing to a relative cheep dosing container.

The container may be provided with one or more vents in the end opposite the first chamber. The vent may be positioned in a bottom plate of the container, thereby preventing the container from bursting, collapsing and securing correct dosing.

In one embodiment, the vents may be covered by a membrane; the membrane securing the container from leaking. The membrane may also prevent liquid from penetrating into the container. Thus, contamination of the product to be dispensed can be avoided. A membrane material may be a material, in which the nature of the micropores allows airflow and equalizes the pressure without allowing liquid to pass. An example of such a material is expanded polytetrafluoethylene (ePTFE).

In some embodiments, the first chamber is releasably attachable to the container. For example, the first chamber may be threaded onto the container, which may be an existing bottle or other container that is retrofit with the first and second chamber.

According to a second aspect, the invention provides a method for manufacturing a dispensing device according to the first aspect of the invention, the method comprising the step of injection moulding at least a part of the dispensing device.

It should be noted that a person skilled in the art would readily recognise that any feature described in combination with the first aspect of the invention could also be combined with the second aspect of the invention, and vice versa.

The method may comprise the steps of:

injection moulding the first chamber, the container and the valve seat plate as one component, injection moulding the second chamber, and attaching the valve flapper plate to the valve seat plate, and placing the assembled first chamber and valve seat plate with the attached valve flapper plate inside the second chamber.

BRIEF DESCRIPTION OF THE DRAWINGS

The invention will now be described in further detail with reference to the accompanying drawings in which.

DETAILED DESCRIPTION OF THE DRAWINGS

Figure 1:
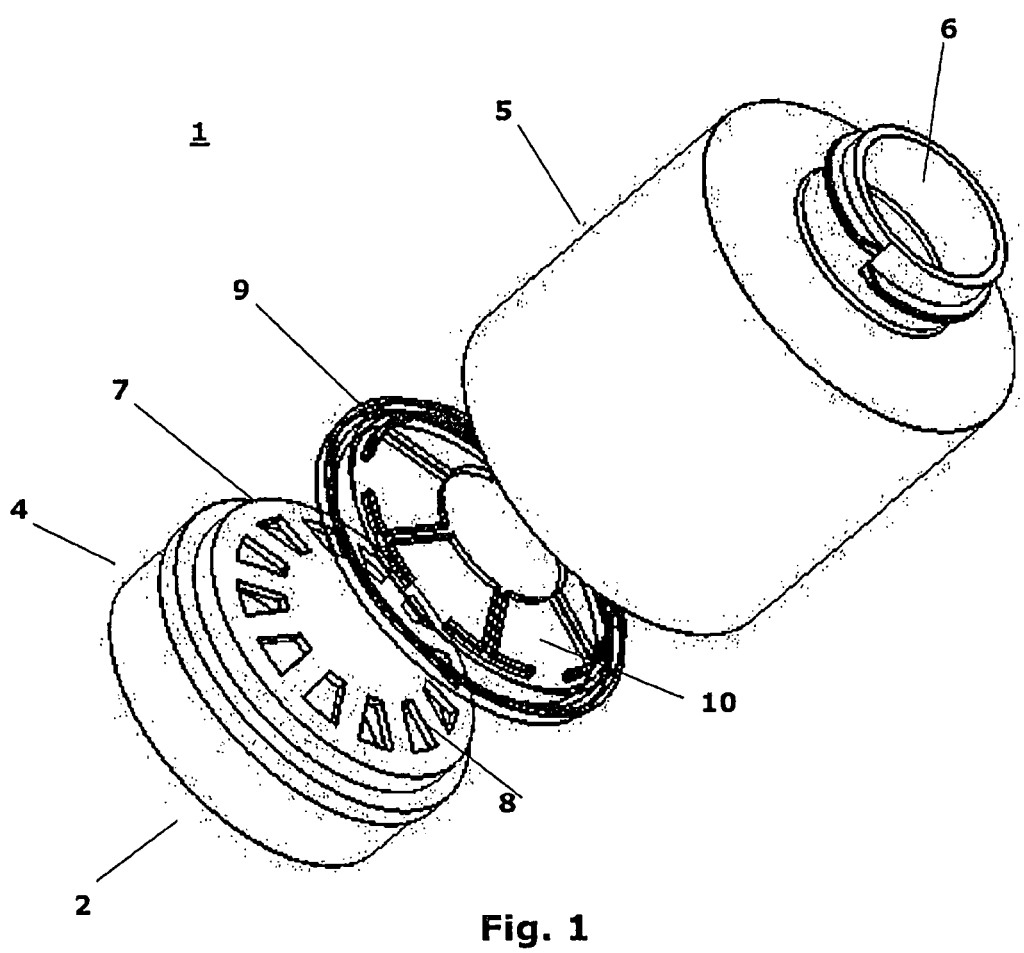
FIG. 1 is a perspective view of a dispensing device according to an embodiment of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Like numbers refer to like elements throughout the description.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

FIG. 1 is a perspective view of an assembly drawing of the dispensing device

The intermediate valve 3 is arranged between the first chamber 4 and the second chamber 5. The second chamber 5 is fluidly connected to an outlet passage 6 adapted to deliver liquid being dispensed by the dispensing device.

The first chamber 4 is fluidly connected to the inlet passage 2. When the dispensing device is mounted on a container containing liquid product, the inlet passage 2 is furthermore fluidly connected to the interior of the container. Thereby liquid product from the container is allowed to enter the first chamber 4 via the inlet passage 2.

The intermediate valve comprises a valve seat plate 7 provided with openings 8. A valve flapper plate 9 is disclosed above the valve seat plate 7. The valve flapper plate is provided with flaps 10 for covering the openings 8 in the valve seat plate 7. When the flaps 10 are lifted, the intermediate valve 3 allows liquid to flow from the first chamber 4 through the openings 8 in the valve seat plate 7 and into the second chamber 5 during dispensing of liquid product.

During storage, i.e. when a dose of liquid product is not being dispensed by the dispenser, a not visible lid can be screwed onto the thread of the second container and the opening can thereby be closed. The lid may have a plane surface and the dispenser is normally orientated in such a manner that the outlet passage 6 faces downward.

When it is desired to dispense a dose of liquid product, the desired dosage amount of liquid flows into the second chamber 5, the measuring chamber. The first chamber 4 that is integrated with the intermediate valve 3 is pulled out of the second chamber 5. When the first chamber 4 is pulled in the direction away from the second chamber, the intermediate valve will automatically open the flaps in the intermediate valve and liquid will pass into the second chamber 5. After filling the second chamber 5 with the desired dose, the first chamber and the intermediate valve are pushed in the direction toward the second chamber 5 whereby the desired dose is dispensed from the container. When pushing the first chamber 4 and the intermediate valve 3 in the direction towards the second chamber 5, the flaps 10 will automatically be pressed against the valve seat plate and thereby close the valve.

Figure 2:
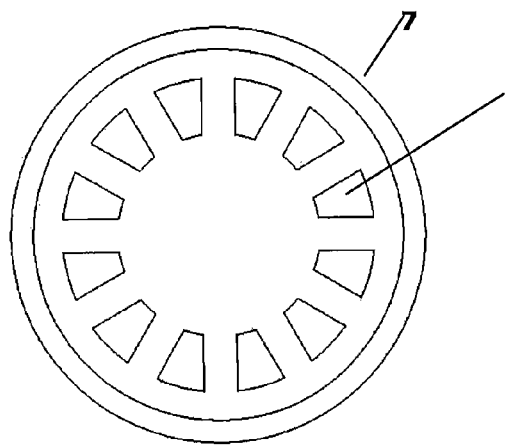
FIGS. 2-5 are different views of the first chamber and the valve seat plate of the embodiment disclosed in FIG. 1.
Figure 3:
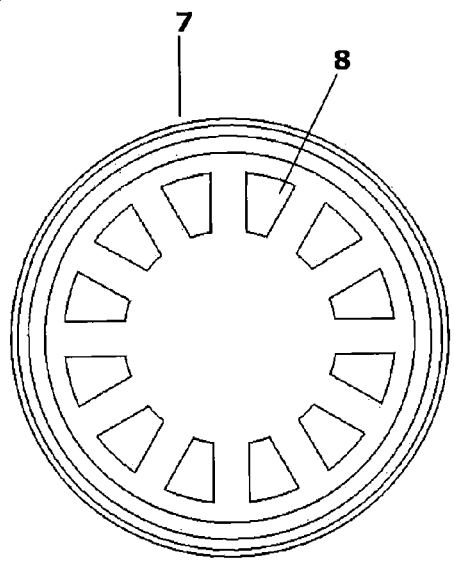
Figure 4:
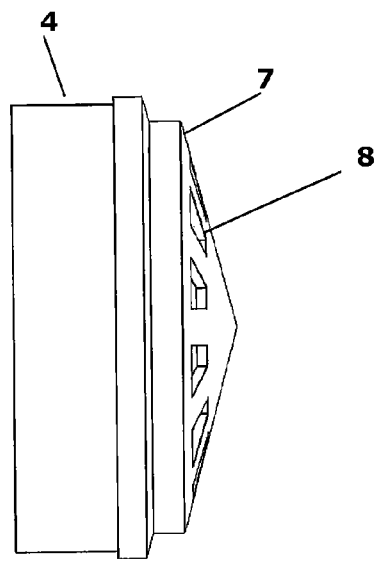
Figure 5:
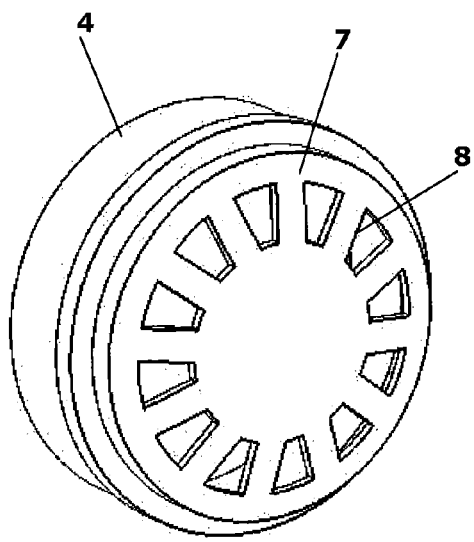

FIGS. 2-5 are different views of the first chamber 4 integrated with a valve seat plate 7 of the embodiment disclosed in FIG. 1. FIG. 2 is the valve seat plate 7 disclosed from the second chamber 5, the dosing chamber. FIG. 3 is a view from the container side, FIG. 4 is a side view, and FIG. 5. is a perspective view. The valve seat plate 7 is disclosed with twelve openings 8.

Figure 6:
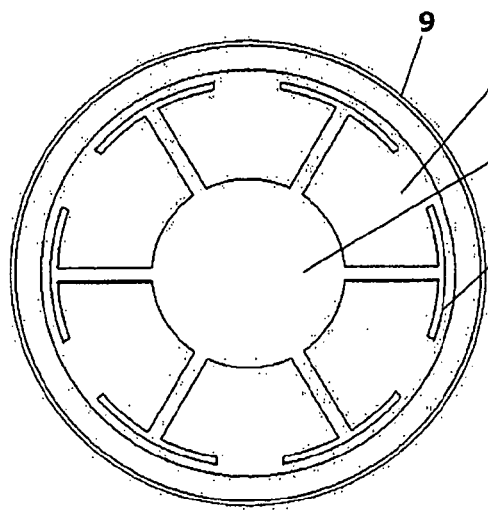
FIGS. 6-9 are different views of the valve flapper plate of the embodiment disclosed in FIG. 1.
Figure 7:
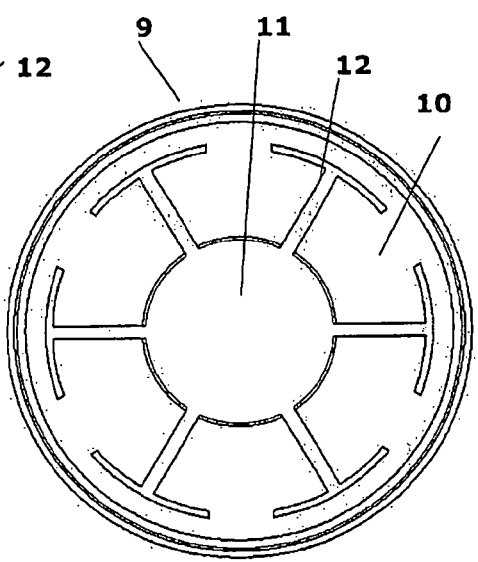
Figure 8:
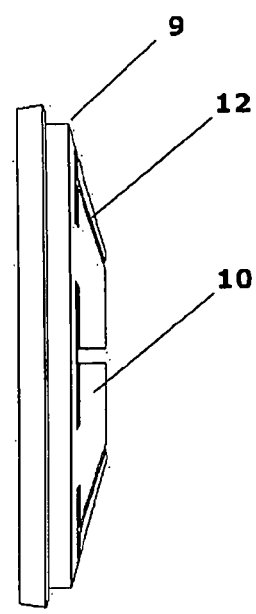
Figure 9:
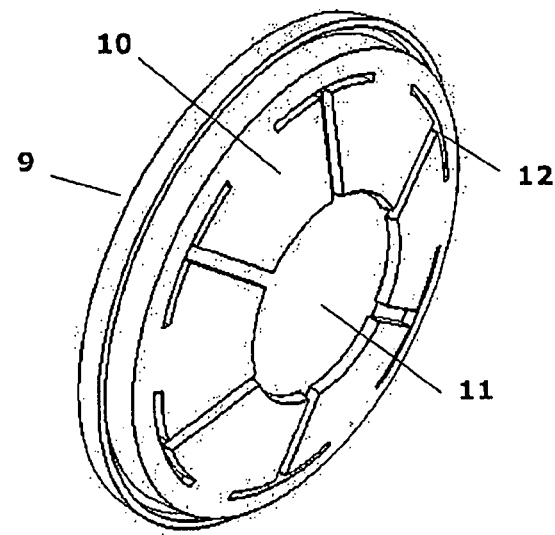

FIGS. 6-9 are different views of the valve flapper plate 9 of the embodiment disclosed in FIG. 1. FIG. 6 is a view from the second chamber 5, FIG. 7 from the container side, FIG. 8 is a side view, and FIG. 9 is a perspective view from the container side. The flapper plate 9 is disclosed with six flaps for covering the twelve openings 8 in the valve seat plate.

Figure 10:
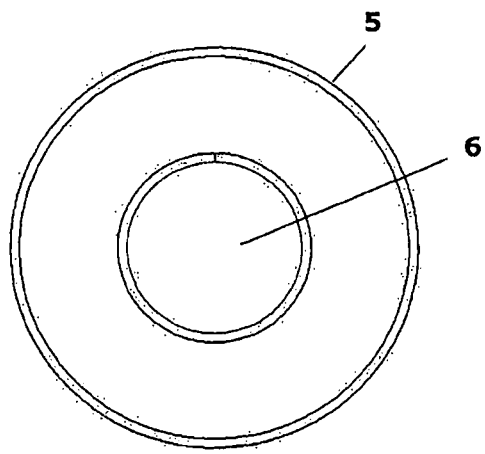
FIGS. 10-13 are different views of the second chamber of the embodiment disclosed in FIG. 1.
Figure 11:
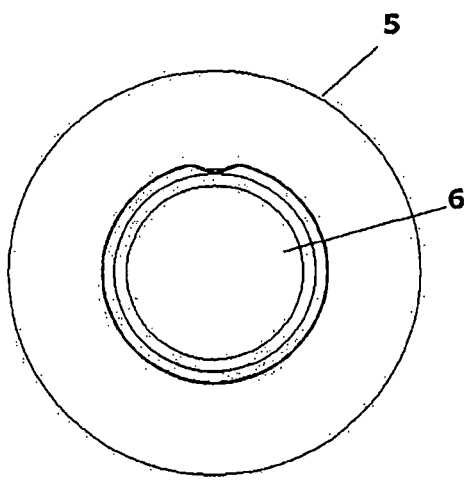
Figure 12:
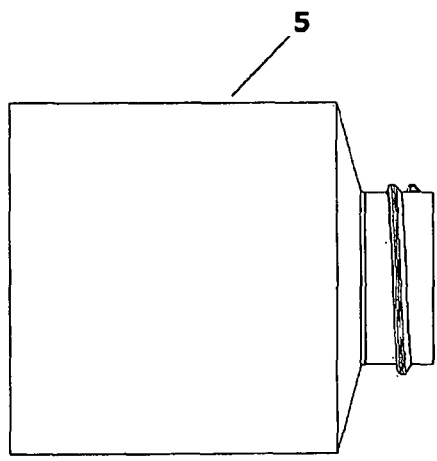
Figure 13:
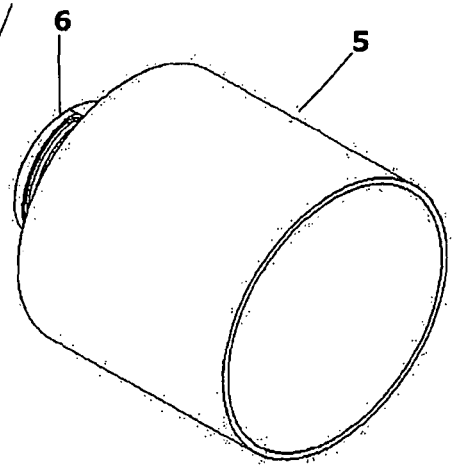

FIGS. 10-13 are different views of the second chamber 5. FIG. 10 from the inside, FIG. 11 from the outside, FIG. 12 from the side and FIG. 13 is a perspective view of the embodiment disclosed in FIG. 1.

Figures 14, 15:
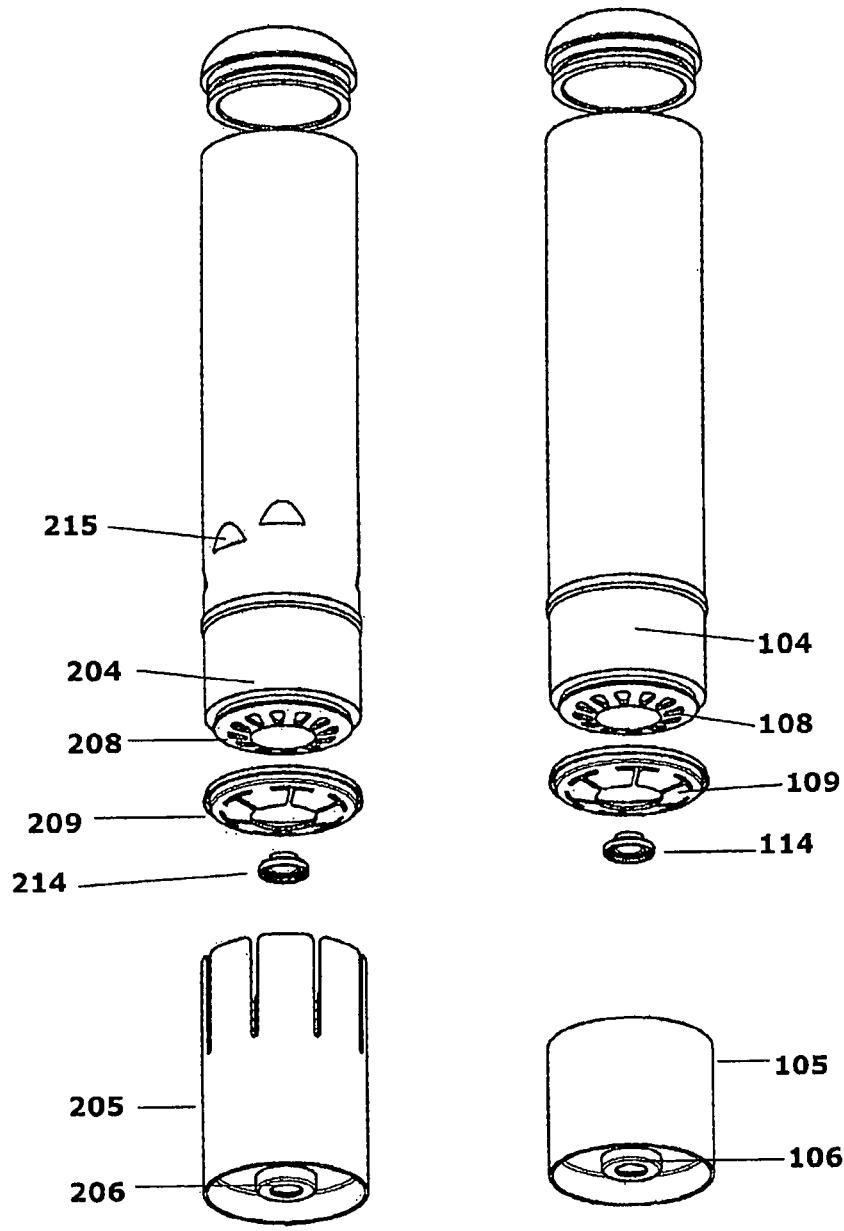
FIG. 14 is a perspective view of an assembly drawing according to an embodiment of the invention.
FIG. 15 is a perspective view of an assembly drawing according to a second embodiment of the invention.

FIG. 14 is a perspective view of an assembly drawing according to an embodiment of the invention. The second chamber 105 is disclosed with an outlet passage 106, a valve element 114 is disclosed to be inserted in the outlet passage 106, the valve flapper plate 109, the valve seat plate 108 being integrated with the first chamber 104 at the container.

FIG. 15 is a perspective view of an assembly drawing according to a second embodiment of the invention. The second chamber 205 is disclosed with an outlet passage 206, a valve element 204 is disclosed to be inserted in the outlet passage 206, the valve flapper plate 209, the valve seat plate 208 being integrated with the first chamber 204 at the container.

Figure 16:
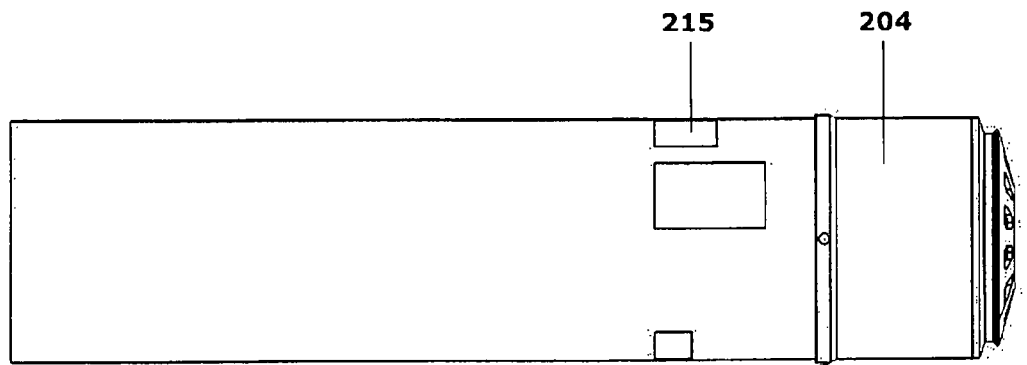
FIGS. 16-19 are different views of a container connected with the first chamber and the valve seat plate of the embodiment disclosed in FIG. 15.
Figure 17:
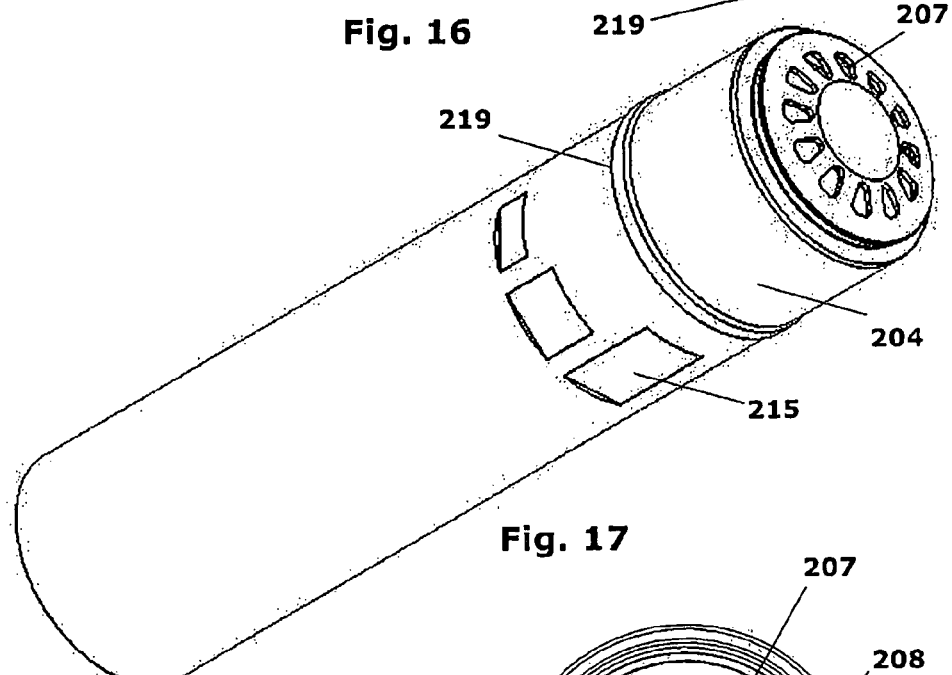
Figure 18:
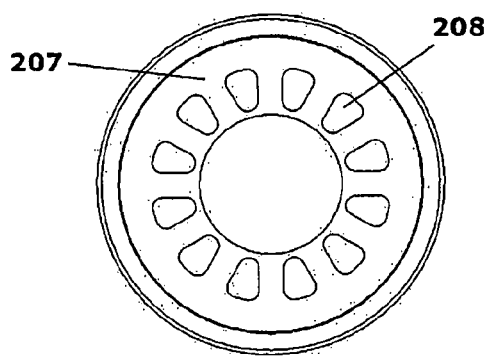
Figure 19:
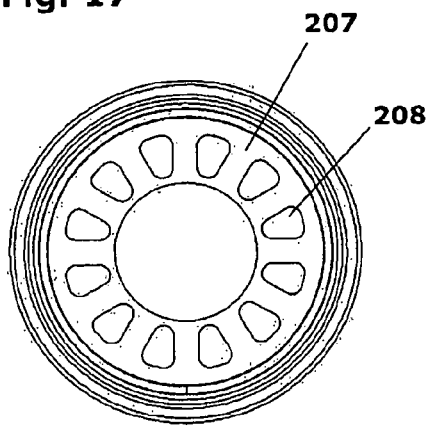
Figure 20:
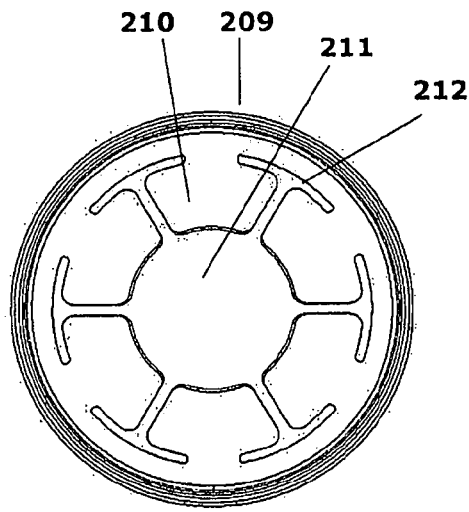
FIGS. 20-23 are different views of the valve flapper plate of the embodiment disclosed in FIG. 15.
Figure 21:
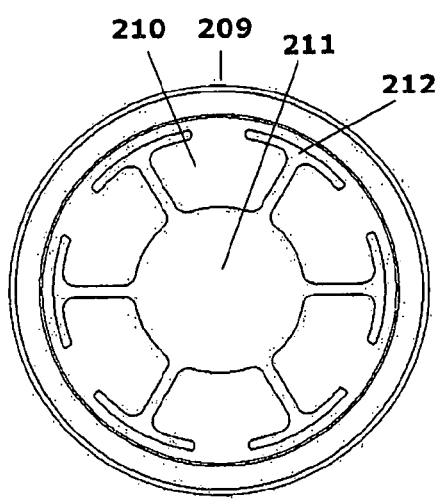
Figure 22:
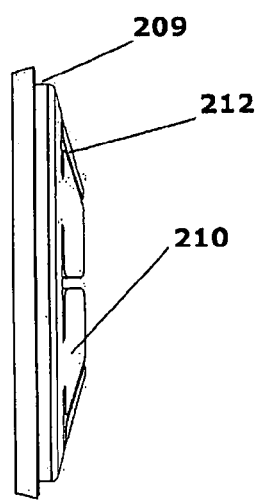
Figure 23:
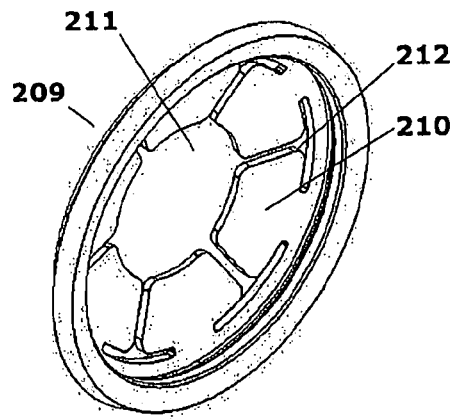
Figure 24:
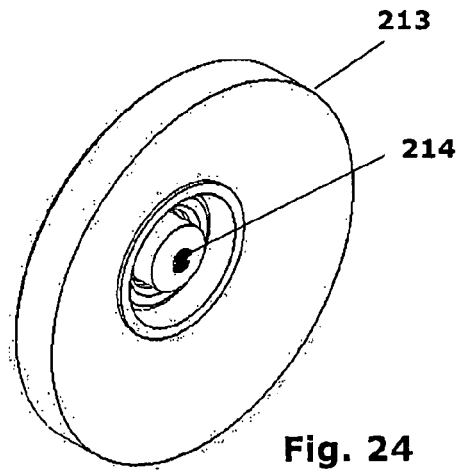
FIGS. 24-27 are different views of second chamber of the embodiment disclosed in FIG. 15.
Figure 25:
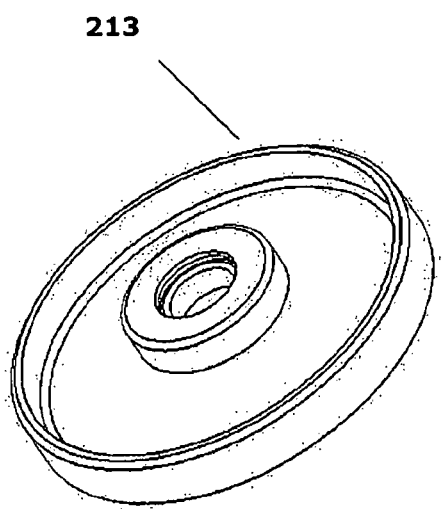
Figure 26:
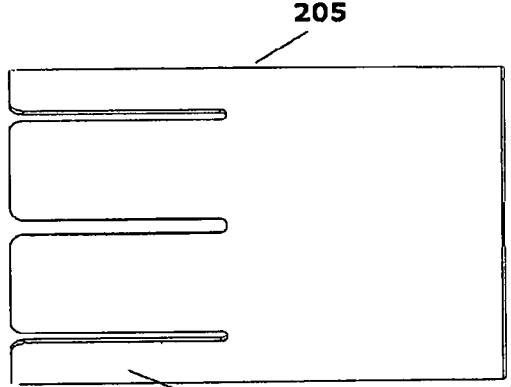
Figure 27:
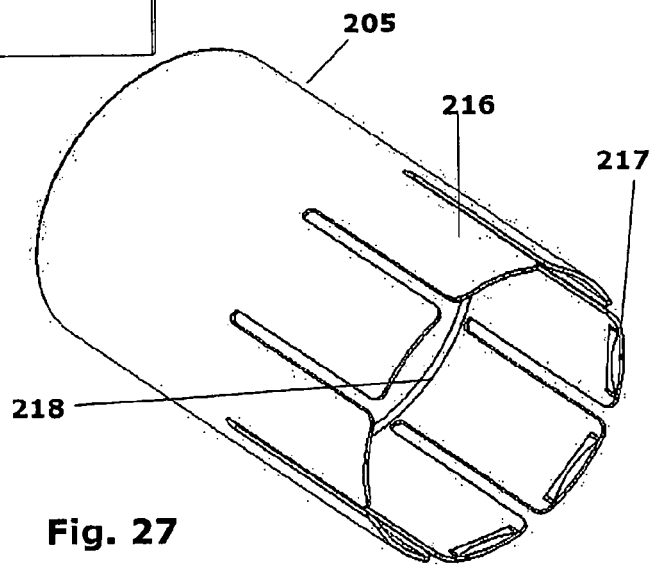

FIGS. 16-19 are different views of a container connected with the first chamber 204 and the valve seat plate 208 of the embodiment disclosed in FIG. 15. FIG. 16 is a side view, FIG. 17 is a perspective view. FIG. 18 is a view from the second chamber, and FIG. 19 from the inside. The container is disclosed with three recesses 215 extending in the longitudinal direction of the container. The recesses have different lengths and can thereby provide the dispensing device with the possibility to dispense three different doses.

FIGS. 20-23 are different views of the valve flapper plate of the embodiment disclosed in FIG. 15.

FIGS. 24-27 are different views of the second chamber 208 of the embodiment disclosed in FIG. 15.

Figure 28:
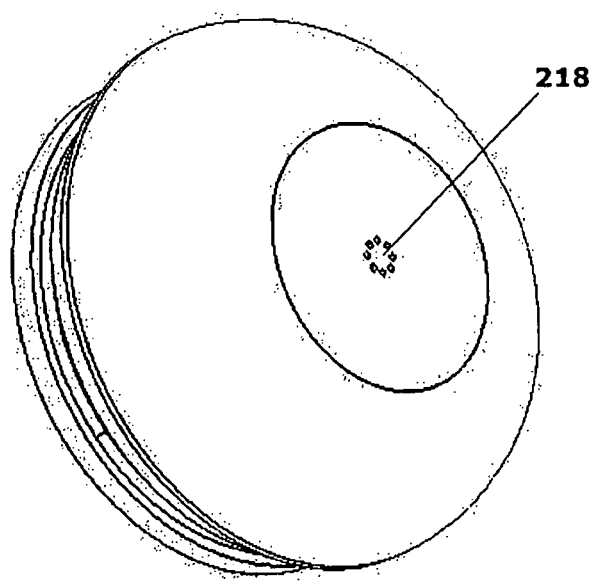
FIG. 28 is a perspective view of a bottom plate with vents for the container of the embodiment disclosed in FIG. 15.

FIG. 28 is a perspective view of a bottom plate with vents 218 for the container of the embodiment disclosed in FIG. 15.

The dispensing device according to the embodiments of the invention disclosed in the FIGS. 15-28 may measure and dispense a dose by slidably longitudinally moving the first chamber 204 within the second chamber 205. The flaps 210 on the flapper plate 209 covering the openings 208 in the valve seat plate 207 move away from the openings in the valve seat plate 207 and liquid flows from the first chamber 204 into the second chamber 205. The flaps 210 are separated by a plurality of T-shaped cuts 212 having therebetween a first leg extending from the opening 211 to the periphery of the valve flapper plate 209 and a second cross leg, extending around a segment of the periphery of the valve flapper plate 209. A selected variable dose of liquid may be dispensed from the container. The dose depends on how far the first chamber 204 is pulled out from the second chamber 205 to fill the second chamber 205. A protrusion 219 on the outside of the first chamber 204 secures that the first chamber 204 and second chamber 205 to limit separation thereof.

On the outer surface thereof, the first chamber 204 is provided with recesses 215 extending substantially in the longitudinal direction of the first chamber 204. The second chamber 205 is provided with tongues 216. The tongues 216 have on the inside thereof an outwardly projected edge 217 that slides in the recess 215 on the outer surface of the first chamber 204 when the tongues 216 presses against the first chamber 204 from the outside. The recesses 215 have different lengths in the longitudinal direction. Having recesses 215 with different lengths in the longitudinal direction may facilitate dosing different selected doses from the container depending on which of the tongues 216 is pressed against the matching recesses 215. Each recess may have a partner with the same length arranged substantially on the opposite side of the first chamber 204. As such, a dispensing device may be provided where the user may press thumb and index finger against two tongues 216 arranged substantially on opposite sides and thereby dispense the claimed dose. When the desired dose is measured into the second chamber 205, the dispenser is ready for dispensing the measured dose by slidably pressing the first chamber 204 into the second chamber 205 in the opposite longitudinal direction from that used to fill the second chamber 205.

The dose will flow out of the outlet passage 206 in the second chamber 205. The illustrated outlet passage 206 includes a closing element 213, shown as a valve 214 in FIG. 15. The valve 214 opens when the pressure from the liquid inside the second chamber 205 rises above a given level.

A vent 218 placed in the container opposite the first chamber 204 ensures that there is no vacuum in the container, and thus securing correct dosing.

Referring now to FIGS. 29-32, another embodiment of a dispensing device, designated broadly at 300, is disclosed therein. The dispensing device 300 includes first and second chambers 304, 305, a valve seat plate 307 with openings 308 (integrated with the first chamber 304), and a valve flapper plate 309 with flaps 310 and an opening 311 as is the case with the embodiments of FIGS. 1-28. Differences in the dispensing device 300 and the prior-described embodiments will be described below.

As shown in FIGS. 29-32, the first chamber 304 includes threads 322 at its lower end. These threads 322 enable the first chamber, and therefore the entire dispensing device, to be threaded onto a separate bottle 320. This configuration enables the dispensing device 300 to be retrofitted to an existing bottle of the proper size, and/or to replace and function as the lid of an existing bottle that can provide a measured dose of a liquid contained in the bottle.

The first chamber 304 further includes two holes 328, each of which receives a respective valve 330 and a circular rib 336 near its valve end. The rib 336 engages and is fixed to the rim 340 of the valve flapper plate 309.

Figure 29:
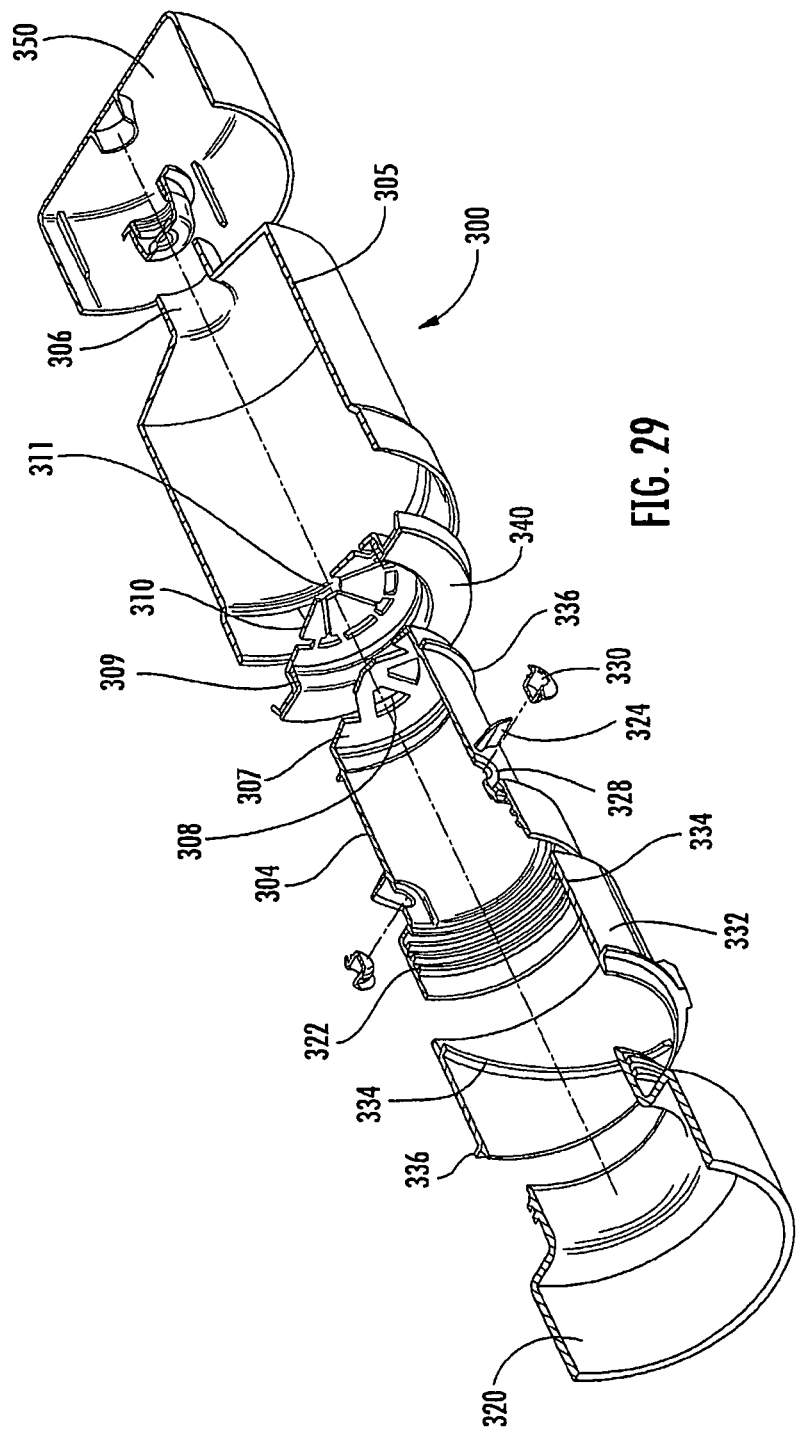
FIG. 29 is an exploded perspective section view of a dispensing device according to additional embodiments of the invention.
Figure 30:
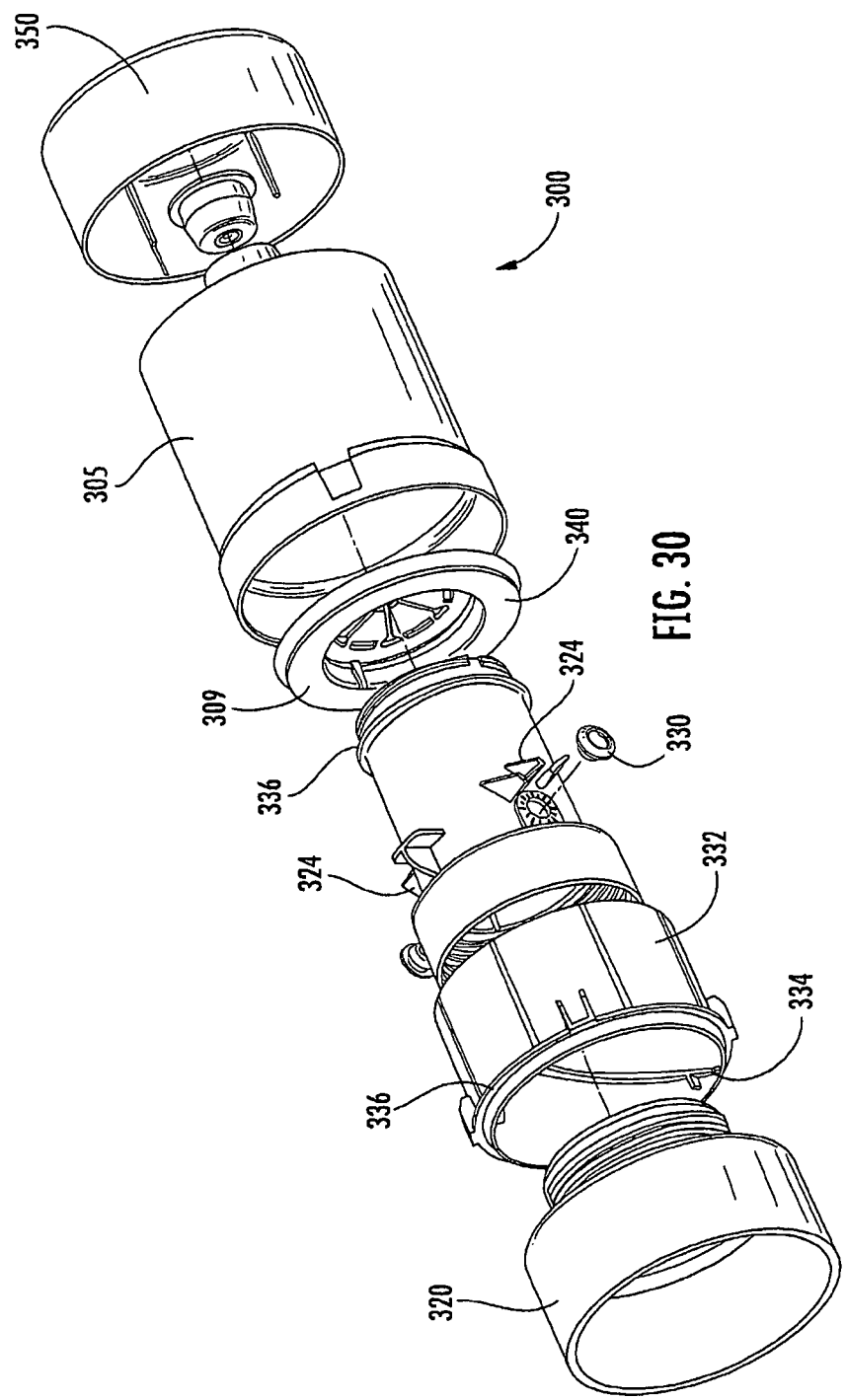
FIG. 30 is an exploded perspective view of the dispensing device of FIG. 29.

The first chamber 304 also includes two rotation guides 324 on its outer surface. The rotation guides 324 are canted to engage a respective thread 334 on the inner surface of a cam sleeve 332 that encircles the threaded end of the first chamber 304. As can be seen in FIG. 29, each of the threads 334 describes a partial helix within the cam sleeve 332. The cam sleeve 332 also has a ridge 336 on its outer surface that contacts the inner surface of the second chamber 305.

In the illustrated embodiment, a lid 350 is attached to the second chamber 305 and covers the outlet passage 306 thereof. The lid 350 can be of many different configurations that would be well-recognized by those of skill in this art and need not be described in detail herein.

Figure 31:
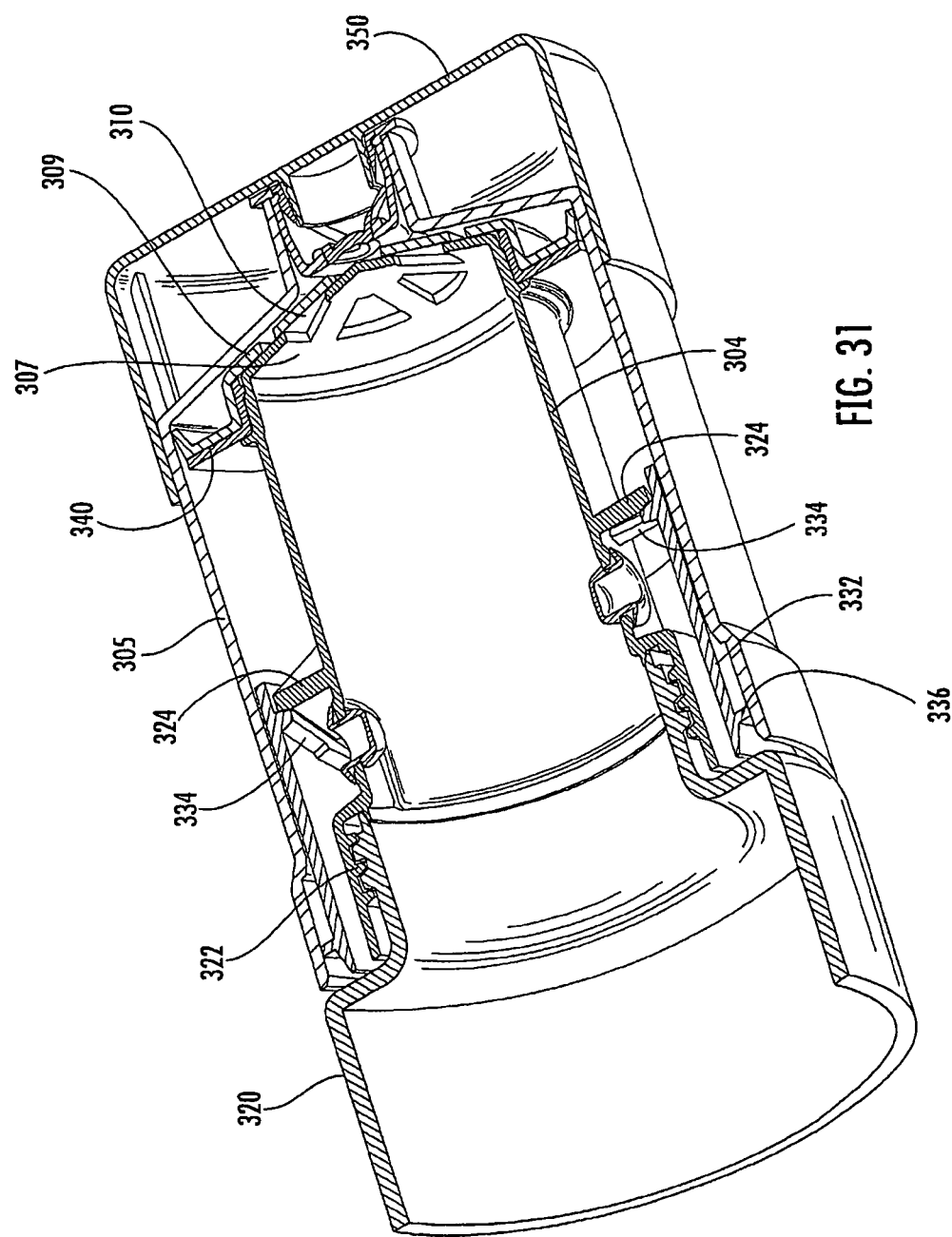
FIG. 31 is a perspective section view of the dispensing device of FIG. 29 with the second chamber in a neutral position.

In operation, the dispensing device 300 begins in a non-dispensing position shown in FIG. 31. In this position, the valve seat plate 307 and valve flapper plate 209 are adjacent the dispensing end of the second chamber 305. The ridge 336 of the cam sleeve 332 contacts the inner surface of the second chamber 305 near its open end. The threads 334 of the cam sleeve 332 engage the rotation guides 324 of the first chamber 304 at their ends farthest from the bottle 320.

Figure 32:
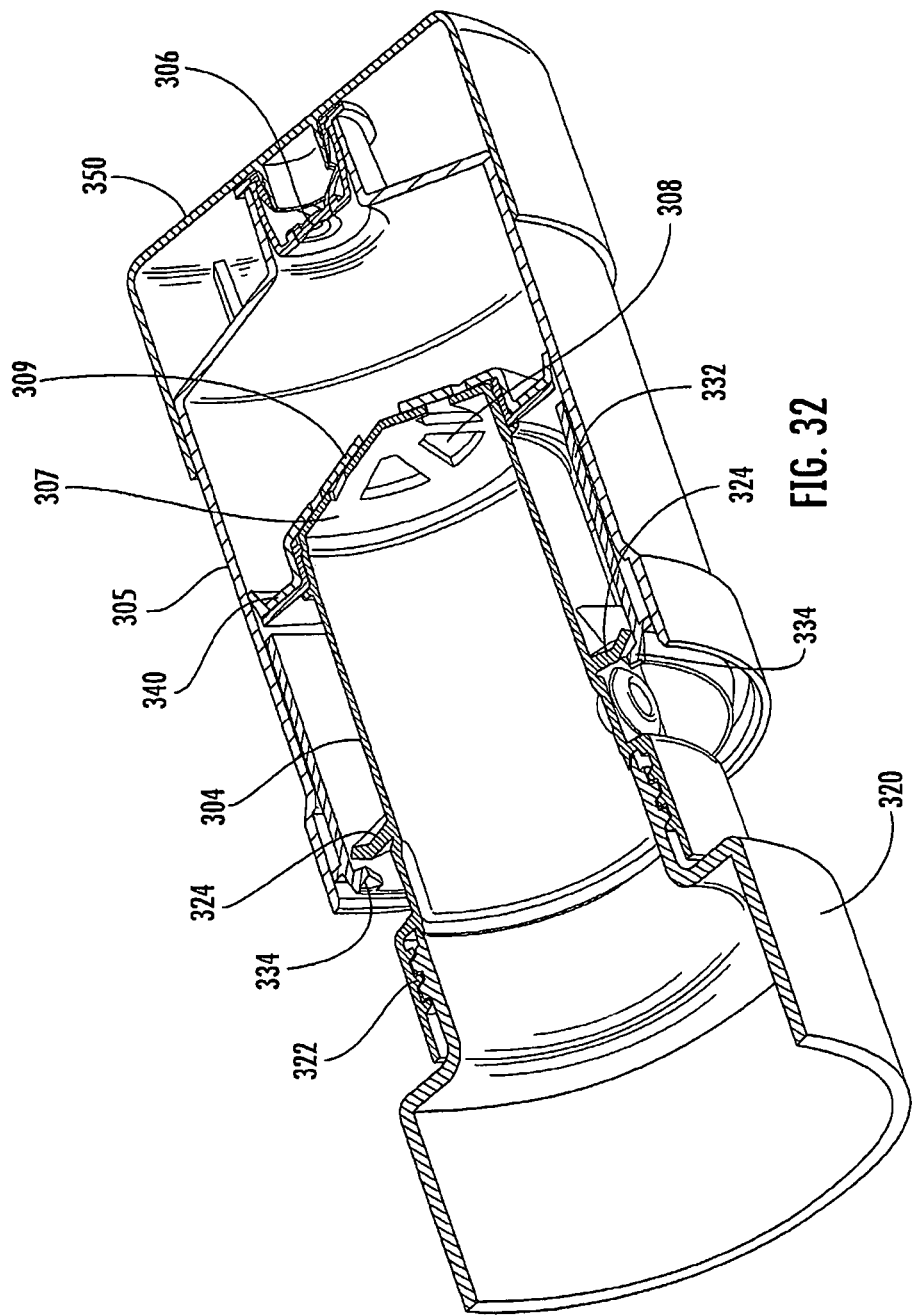
FIG. 32 is a perspective section view of the dispensing device of FIG. 29 with the second chamber positioned to receive a measured dose of liquid.

To dispense a measured dose of liquid, the second chamber 305, cam sleeve 332 and lid 350 are rotated relative to the first chamber 304 and bottle 320. Such rotation, controlled by the interaction between the threads 334 of the cam sleeve 332 and the rotation guides 324 of the first chamber 304, drives the second chamber 305, cam sleeve 332 and lid 305 longitudinally away from the first chamber 304 and bottle 320 (FIG. 32). The relative longitudinal movement deflects the flaps 310 of the valve flapper plate 309 away from the holes 308 in the valve seat plate 307, thereby providing openings for liquid to flow from the first chamber 304 to the second chamber 305 in the manner described above with respect to the embodiments of FIGS. 1-28. Once the second chamber 305 is filled with liquid, the flaps 310 recover to their original positions covering the holes 308; the lid 350 can then be removed from the second chamber 305 and the measured dose of liquid dispensed from the second chamber 305 through the outlet passage 306.

It will be understood that the dispensing device 300 may be used as a cap or lid to an existing bottle; the device 300 may simply be screwed onto the threads of the bottle 320 as a replacement for an existing lid to provide a measured dose of the liquid of interest.

Although not shown, in some embodiments the second chamber 305 may include markings or other indicia on its visible surface to indicate the amount of liquid being dispensed. For example, if the full measured dose of liquid is 1 cup and requires a 180 degree rotation of the second chamber 305, a quarter turn of the second chamber 305 may be marked with a ½ cup measurement indicia, a ⅛ turn may be marked with a ¼ cup measurement indicia, etc. In some embodiments, there may be detents, notches or the like in the threads 334 of the cam sleeve 332 that engage the guides 324 of the first chamber 304 to temporarily "lock" the cam sleeve 332 at a desired rotation for a particular measured dose that is less than the full measured dose.

Figure 33:
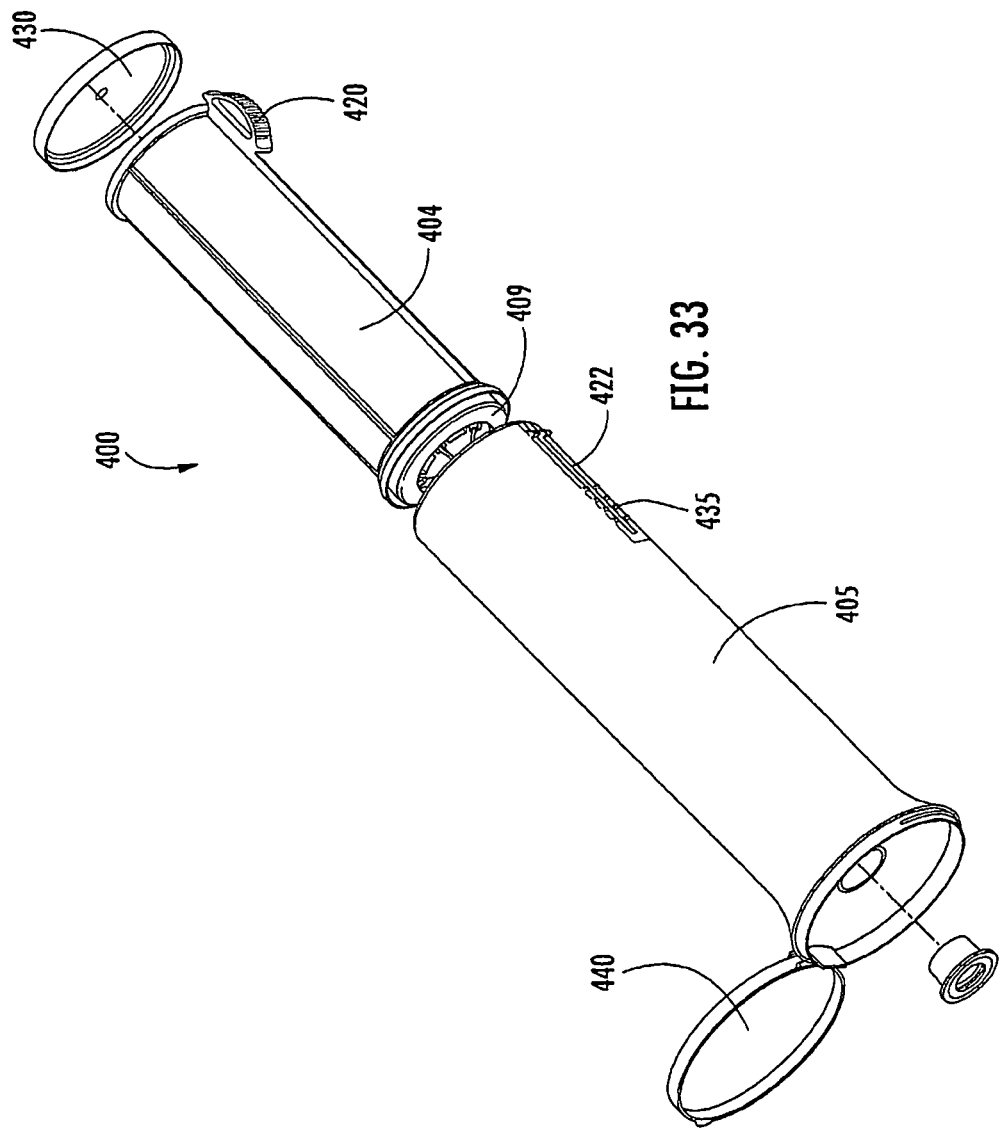
FIG. 33 is an exploded perspective view of a dispensing device according to additional embodiments of the invention.
Figure 34:
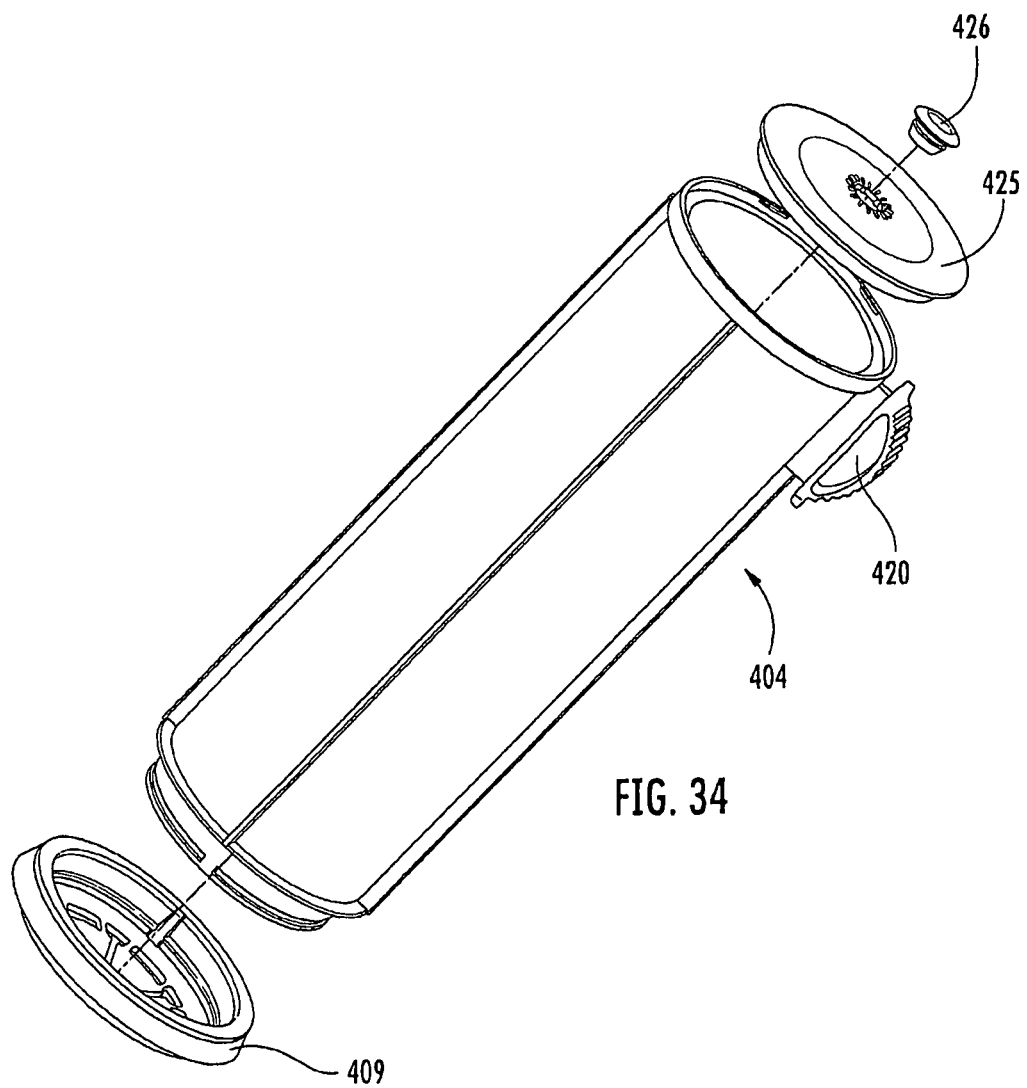
FIG. 34 is an exploded view perspective view of the first chamber of the dispensing device of FIG. 33.
Figure 35:
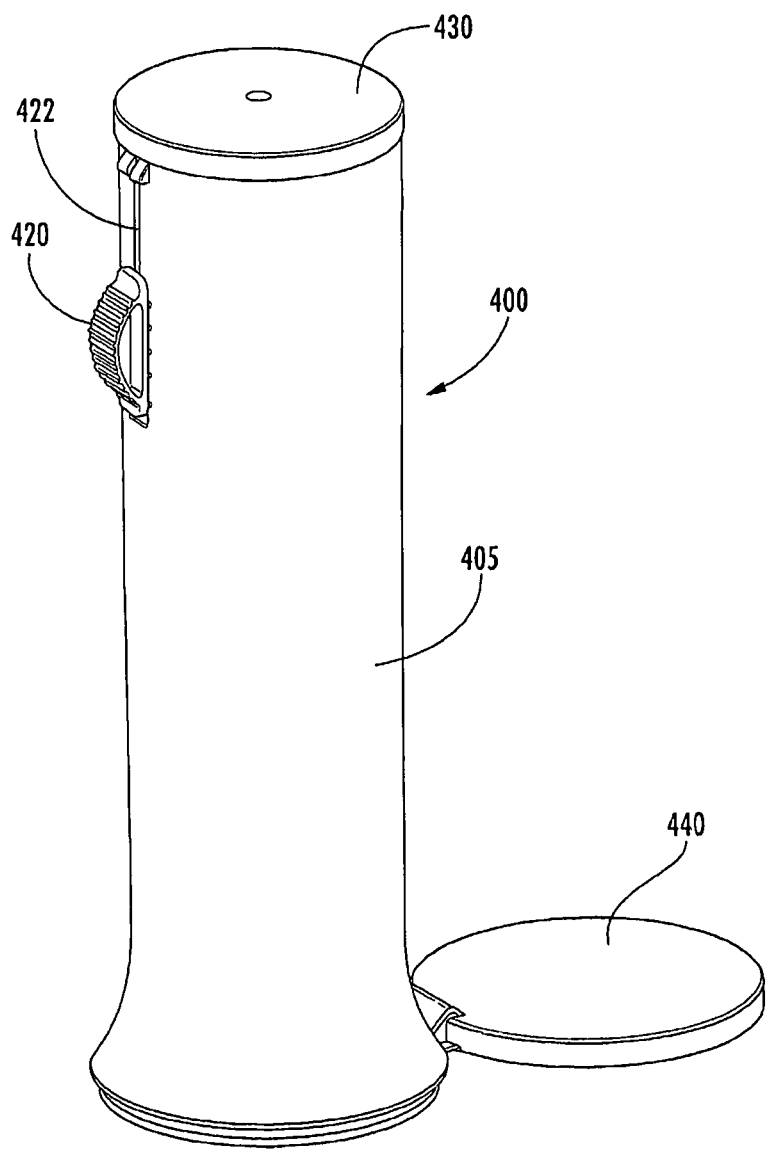
FIG. 35 is a perspective view of the dispensing device of FIG. 35.

An additional embodiment of a dispensing device, designated broadly at 400, is illustrated in FIGS. 33-35. The device 400 includes a first chamber 404 and a second chamber 405 and is sized to be able to be handled by an operator with one hand, not unlike a "clickable" pen. To that end, the first chamber 404 includes a projection 420 on its outer wall that fits within a narrow slot 422 at the top end of the second chamber 405. A cover 430 fits over the top end of the first chamber 404, and a hinged cap 440 is attached to and fits over the dispensing end of the second chamber 405. The first chamber 404 includes a valve seat plate (not shown) and a valve flap plate 409 of the general configuration described above. The first chamber 404 also includes a inner cover 425 and a valve 426 (FIG. 35) embedded therein to facilitate loading of liquid into the first chamber 404.

When liquid is loaded into the first chamber 404, the projection 420 is located toward the dispensing end of the slot 422. Once liquid is present in the first chamber, the projection 420 can be pushed toward the top end of the slot 422 (typically with the user's thumb), which action draws liquid into the second chamber 405 due to the action of the flaps of the valve flap plate in the manner described above. When the projection 420 (and, in turn, the first chamber 404) stops sliding relative to the second chamber 405, the flaps close, and the prescribed measured dose of liquid is present in the second chamber 405. At this point the projection 420 can be pushed toward its original position in the slot 422 (again, typically with the user's thumb), thereby dispensing liquid from the second chamber 405 through an outlet 410.

One potential advantage of the device 400 is its size; it typically is sized to dispense very small measured doses of liquid. For example, the first chamber may hold from 10 to 250 mL of liquid, and be able to provide measured doses in quantities as small as 0.25 mL. Such dispensing can be performed quite quickly and easily just by manipulating the projection 420 with one's thumb.

Also, as described above with respect to the device 300, indicia may be included on the second chamber 405 near the slot 422 showing that indicates how far the projection 420 should be moved to dispense a measured dose of liquid that is less than the full amount; alternatively, the second chamber 405 may have a transparent "window" with markings that indicate the amount of liquid in the second chamber 405.

Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

The invention claimed is:

1. A method of dispensing a measured dose of a liquid product from a container containing said product, the method comprising the steps of:
   (a) providing a dispensing device comprising:
      a first chamber and a second chamber, the first chamber being longitudinally movable in the second chamber and having an outer surface sealingly contacting an inner surface of the second chamber;
      an inlet passage including at least one inlet opening that establishes a fluid connection between the first chamber and an interior part of the container;
      an outlet passage adapted to deliver the liquid product being dispensed by the dispensing device, said outlet passage being fluidly connected to the second chamber;
      an intermediate valve positioned between an interior part of the first chamber and an interior part of the second chamber, the intermediate valve configured to move to an open position, which allows liquid product to flow from the interior space of the first chamber to the interior space of the second chamber when the first chamber is moved relative to the second chamber in a first longitudinal direction, and to a closed position, which limits flow of the liquid product from the interior space of the second chamber to the interior space of the first chamber when the first chamber is moved relative to the second chamber in an opposite second longitudinal direction to dispense the liquid product from the second chamber through the outlet passage; and
      a thumb projection mounted to and extending from the exterior of the first chamber;
   (b) grasping the second chamber at least partially in the palm of the hand, with the thumb engaging the thumb projection of the first chamber, as the valve is in the closed position;
   (c) pushing the thumb projection with the thumb to move the first chamber relative to the second chamber in the first longitudinal direction, thereby moving the valve to the open position and enabling a measured dose of liquid product to flow into the interior space of the first chamber; and
   (d) pulling the thumb projection with the thumb to move the first chamber relative to the second chamber in the second longitudinal direction, thereby moving the valve to the closed position and dispensing the measured dose of liquid product through the outlet passage.

2. A method according to claim 1, wherein the first chamber is an integrated part of the container.

3. A method according to claim 1, wherein the first chamber is releasably attachable to the container.

4. A method according to claim 1, wherein the first chamber is threaded onto the container.

5. A method according to claim 1, wherein the relative movement between the first chamber and the second chamber comprises sliding movement.

6. A method according to claim 1, wherein the first chamber and/or the second chamber includes an indication showing a volume of the second chamber depending on how far the first chamber is moved into the second chamber.

7. A method according to claim 1, wherein the outlet passage is provided with a closing member.

8. A method according to claim 1, wherein the first chamber and the second chamber are transparent.

* * * * *

UNITED STATES PATENT AND TRADEMARK OFFICE
CERTIFICATE OF CORRECTION

PATENT NO. : 9,499,305 B2
APPLICATION NO. : 14/379944
DATED : November 22, 2016
INVENTOR(S) : Nielsen Page 1 of 1

It is certified that error appears in the above-identified patent and that said Letters Patent is hereby corrected as shown below:

In the Claims
Column 13, Claim 4, Line 8:
Please correct "claim 1," to read -- claim 3, --

Signed and Sealed this
Twenty-third Day of May, 2017

Michelle K. Lee
*Director of the United States Patent and Trademark Office*